US007926633B2

(12) United States Patent
Lahargou et al.

(10) Patent No.: US 7,926,633 B2
(45) Date of Patent: Apr. 19, 2011

(54) COMPACT SHOCK ABSORBER FOR AN AIRCRAFT UNDERCARRIAGE, AND AN UNDERCARRIAGE INCLUDING SUCH A SHOCK ABSORBER

(75) Inventors: Andre Lahargou, Vauhallan (FR); Marc Brune, Pontault Combault (FR)

(73) Assignee: Messier-Dowty SA, Velizy Villacoublay (FR)

( * ) Notice: Subject to any disclaimer, the term of this patent is extended or adjusted under 35 U.S.C. 154(b) by 581 days.

(21) Appl. No.: 11/938,887

(22) Filed: Nov. 13, 2007

(65) Prior Publication Data
US 2008/0111022 A1    May 15, 2008

(30) Foreign Application Priority Data

Nov. 13, 2006    (FR) ...................................... 06 09906

(51) Int. Cl.
*F16F 15/08* (2006.01)
(52) U.S. Cl. ........................................ 188/314; 188/318
(58) Field of Classification Search .................. 188/269, 188/314, 318; 267/64.15, 64.17
See application file for complete search history.

(56) References Cited

U.S. PATENT DOCUMENTS

| | | | | | |
|---|---|---|---|---|---|
| 5,295,563 | A | * | 3/1994 | Bennett | 188/266.2 |
| 5,351,790 | A | * | 10/1994 | Machida | 188/314 |
| 5,593,007 | A | * | 1/1997 | Siltanen | 188/269 |
| 5,624,105 | A | * | 4/1997 | Runkel | 267/64.15 |
| 6,029,958 | A | * | 2/2000 | Larsson et al. | 267/113 |
| 6,213,263 | B1 | * | 4/2001 | De Frenne | 188/318 |
| 7,413,062 | B2 | * | 8/2008 | Vandewal | 188/266.5 |
| 7,441,638 | B2 | * | 10/2008 | Hanawa | 188/314 |
| 2006/0021833 | A1 | * | 2/2006 | Runkel | 188/314 |

* cited by examiner

*Primary Examiner* — Christopher P Schwartz
(74) *Attorney, Agent, or Firm* — McCormick, Paulding & Huber LLP

(57) ABSTRACT

The invention relates to a shock absorber for an aircraft undercarriage, the shock absorber comprising a main cylinder in which a rod is mounted to slide telescopically, the shock absorber having one or more pneumatic chambers filled with gas, a supply of hydraulic fluid, and throttle means for throttling the hydraulic fluid such that when the shock absorber is shortened, the gas in the pneumatic chamber(s) is compressed and the hydraulic fluid is throttled, in which the pneumatic chamber(s) is/are fully contained in one or more auxiliary cylinders external to the main cylinder, and in each of which a sealed piston is slidably mounted to separate a pneumatic chamber contained in said external auxiliary cylinder from a fluid chamber in fluid flow communication with the main cylinder. According to the invention, the throttle means are disposed at the inlet of a fluid flow connection between the main cylinder and the auxiliary cylinder(s).

9 Claims, 1 Drawing Sheet

COMPACT SHOCK ABSORBER FOR AN AIRCRAFT UNDERCARRIAGE, AND AN UNDERCARRIAGE INCLUDING SUCH A SHOCK ABSORBER

CROSS-REFERENCE TO RELATED APPLICATIONS

This application is entitled to the benefit of and incorporates by reference in its entirety French Patent Application No. 06 09906 filed on Nov. 13, 2006.

FIELD OF THE INVENTION

The invention relates to a compact shock absorber for an aircraft undercarriage, and to an undercarriage including such a shock absorber.

BACKGROUND OF THE INVENTION

In general, undercarriages include an oleo damper comprising a cylinder in which a rod is mounted to slide telescopically. In direct undercarriages, the cylinder constitutes the strut of the undercarriage and the rod carries one or more wheels at its bottom end. In undercarriages using a hinged rocker beam, the wheels are carried by the hinged rocker beam and the shock absorber is mounted to be hinged firstly to the rocker beam and secondly to the aircraft or to a strut of the undercarriage.

The oleo damper includes at least one pneumatic chamber filled with gas that is compressed when the shock absorber is shortened. It also includes means for throttling the hydraulic fluid while it is being shortened, which assumes that there is a supply of hydraulic fluid connected in series with the chamber for the gas. Damping impacts during landing requires the shock absorber to have a certain shortening stroke over which the gas is compressed and the hydraulic fluid throttled. As a general rule, this stroke is of the order of a few tens of centimeters. This stroke and the length of the pneumatic chamber and the length of the supply of hydraulic fluid determine the empty length of the shock absorber.

Aircraft are being optimized more and more, and the room available in the wheel bay for receiving the undercarriage is becoming more and more limited. In general, the aircraft manufacturer specifies the position(s) of the wheel(s) when the undercarriage is in the extended position and also the position(s) of the wheel(s) when the undercarriage is in the retracted position. The designer of the undercarriage then attempts to design an undercarriage having a mechanism that enables the two specified wheel positions to be complied with and that can accommodate a shock absorber of appropriate length. In certain recent projects that are particularly optimized, it has not been possible to make use of an oleo damper of conventional design and that is also capable of satisfying all of the specified constraints. Other than requesting the aircraft manufacturer to provide more volume in the wheel bay, it would therefore appear necessary to provide a shock absorber that is shorter and more compact, while nevertheless allowing for the strokes that are normally used.

The situation becomes even more complicated if, as happens with certain hinged rocker beam undercarriages, such as those of helicopters, the shock absorber is also required, in addition, to drive the extension/retraction function for the undercarriage. The retraction stroke is often longer than the shock-absorbing stroke, thereby lengthening the shock absorber correspondingly.

Documents GB 2 057 629, EP 0 398 797, FR 819 164, GB 942 804, and EP 1 085 233 disclose shock absorbers including at least one external auxiliary cylinder receiving a pneumatic chamber of the shock absorber.

OBJECT OF THE INVENTION

An object of the invention is to provide an external auxiliary cylinder shock absorber that is simple in structure.

BRIEF SUMMARY OF THE INVENTION

The invention provides a shock absorber for an aircraft undercarriage, the shock absorber comprising a main cylinder in which a rod is mounted to slide telescopically, the shock absorber having one or more pneumatic chambers filled with gas, a supply of hydraulic fluid, and throttle means for throttling the hydraulic fluid such that when the shock absorber is shortened, the gas in the pneumatic chamber(s) is compressed and the hydraulic fluid is throttled, in which the pneumatic chamber(s) is/are fully contained in one or more auxiliary cylinders external to the main cylinder, and in each of which a sealed piston is slidably mounted to separate a pneumatic chamber contained in said external auxiliary cylinder from a fluid chamber in fluid flow communication with the main cylinder. According to the invention, the throttle means are disposed at the inlet of a fluid flow connection between the main cylinder and the auxiliary cylinder(s).

This disposition avoids large pressures developing in the main cylinder due to throttling not being transmitted over a connection and into the auxiliary cylinder(s). In addition, the throttling means can be designed to be secured to the auxiliary cylinder(s), thereby simplifying the structure of the main cylinder.

Thus, the pneumatic chamber(s) is/are rejected into one or more external auxiliary cylinders so that the main cylinder contains hydraulic fluid only, thereby simplifying construction of the assembly, and offsetting sealing problems to the auxiliary cylinders which are subjected to no structural mechanical forces other than those coming from the pressures that exist within the external auxiliary cylinders. In particular, the external auxiliary cylinders are not subjected to deformation as a result of landing forces. This makes gas-tightness easier to achieve.

According to a particular aspect of the invention, the auxiliary cylinder(s) is/are secured to the main cylinder. Thus, the shock absorber forms a unitary assembly without it being necessary to provide specific fastenings for the auxiliary cylinder(s) in the wheel bay of the aircraft or on the undercarriage.

In a preferred disposition, the auxiliary cylinder(s) is/are fastened rigidly to the main cylinder, the hydraulic fluid chamber in each auxiliary cylinder being separated from the hydraulic fluid supply of the main cylinder solely by the throttle means disposed at the inlet to each said auxiliary cylinder. This disposition makes it possible to avoid having recourse to a fluid flow connection.

BRIEF DESCRIPTION OF THE DRAWING

These aspects of the invention and other aspects can be understood more fully in the light of the sole figure of the accompanying drawing, which is a section view through a shock absorber in a particular embodiment of the invention incorporating the extension/retraction function, and shown in the extended position.

DETAILED DESCRIPTION OF THE INVENTION

Figure 1:
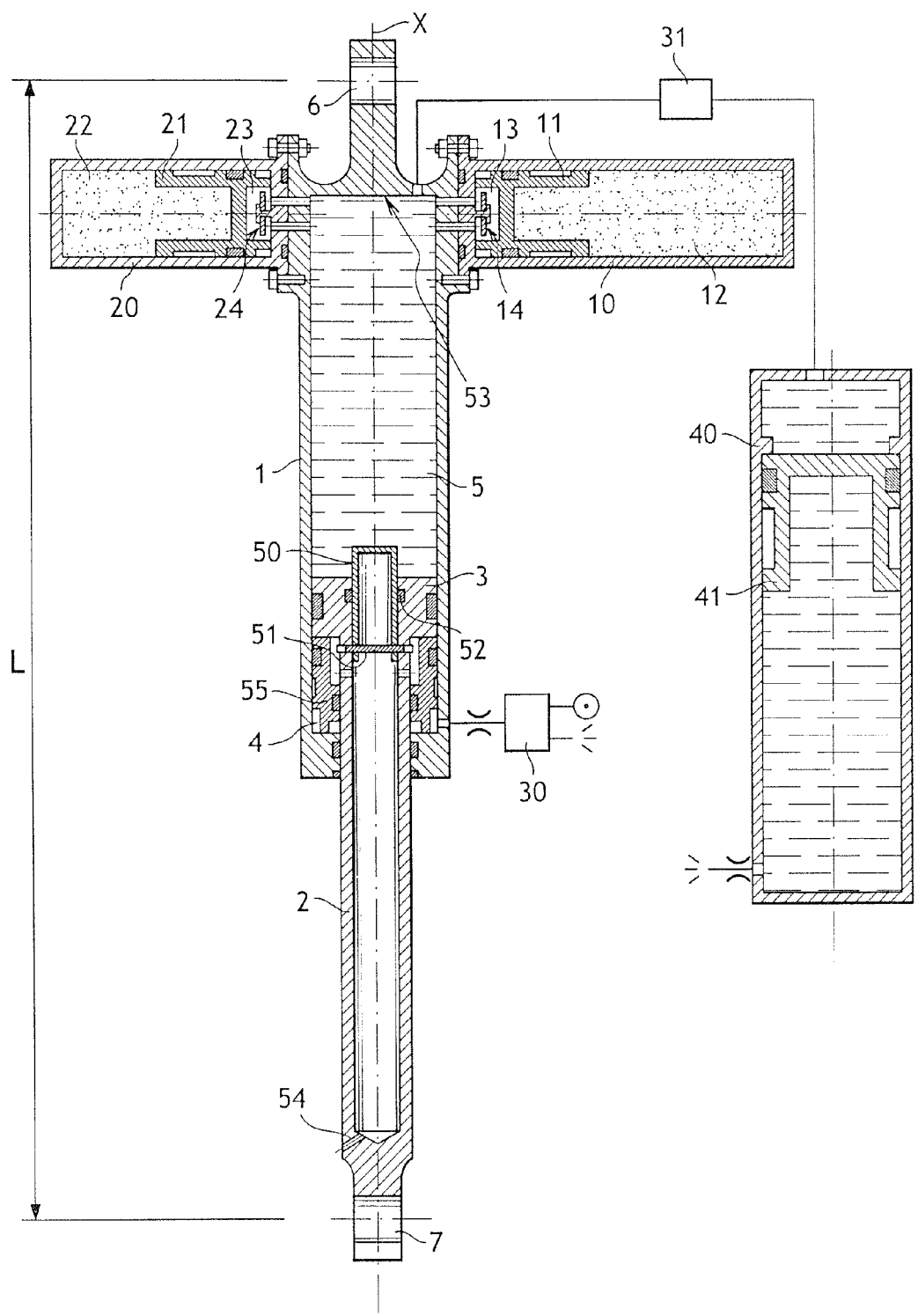

The invention is illustrated herein for a shock absorber used for a helicopter main undercarriage of the type that comprises a rocker beam directly hinged to the fuselage of the helicopter, the shock absorber described herein being for hinge mounting between the rocker beam and a hinge point on the fuselage.

The shock absorber comprises a main cylinder 1 in which a rod 2 is mounted to slide telescopically. For this purpose, the rod 2 carries a sealing piston 3 that slides inside the main cylinder 1 and that defines therein an annular chamber 4 (interrupted by the rod 2), and an uninterrupted chamber 5 filled with hydraulic fluid, forming a supply of hydraulic fluid. The ends of the main cylinder 1 and of the rod 2 carry lugs 6, 7 for hinge connection of the shock absorber to the fuselage at one end and to the rocker beam of the undercarriage at the other end.

The shock absorber has a first auxiliary cylinder 10 rigidly mounted on the main cylinder, e.g. as shown by screw-fastening with an interposed sealing gasket, close to the end lug 6 of the main cylinder 1. The first auxiliary cylinder 10 extends in a direction substantially perpendicular to a longitudinal axis X of the main cylinder 1. A first piston 11 is mounted to slide in sealed manner in the first auxiliary cylinder 10 to separate the inside thereof into a first pneumatic chamber 12 filled with gas under pressure and a first fluid chamber 13 in communication with the uninterrupted chamber 5 of the main cylinder 1 via a first throttle member 14.

The shock absorber has a second auxiliary cylinder 20 rigidly mounted on the main cylinder, e.g. as shown by screw-fastening with an interposed sealing gasket, in the proximity of the end lug 6 of the main cylinder 1. The second auxiliary cylinder 20 extends on the other side of the main cylinder 1 substantially on the same axis as the first auxiliary cylinder 10. A second piston 21 is mounted to slide in sealed manner inside the second auxiliary cylinder 20 to subdivide the inside thereof into a second pneumatic chamber 22 filled with gas under pressure, and a second fluid chamber 23 in communication with the uninterrupted chamber 5 of the main cylinder 1 via a second throttle member 24.

The throttle members 14 and 24 are well known to the person skilled in the art and they are not described in detail herein.

The fluid flow connection between the uninterrupted chamber 5 and the auxiliary cylinders 10 and 20 in this example is as simple as possible, since the auxiliary cylinders are directly in communication with the uninterrupted chamber 5 via the throttle members 14, 24 disposed at the inlet to the auxiliary cylinders, thus making it possible to avoid using any pipework.

The first pneumatic chamber 12 is inflated to a first pressure, while the second pneumatic chamber 22 is inflated to a second pressure that is greater than the first pressure. Typically, the first pneumatic chamber 12 is inflated to 20 bars, while the second pneumatic chamber 22 is inflated to 80 bars.

The operation of the shock absorber during a landing is as follows. Under drive from the rocker beam tending to shorten the shock absorber, the rod 2 is pushed into the main cylinder 1, thereby forcing the hydraulic fluid contained in the uninterrupted chamber 5 to pass through the first and second throttle members 14, 24 to fill the first and second hydraulic fluid chambers 13, 23, thereby pushing back the first and second pistons 11, 21 to compress the gas contained in the first and second pneumatic chambers 12, 22.

Under normal conditions, the annular chamber 4 is connected via a first controlled valve 30 to a supply of hydraulic fluid or hydraulic tank of the aircraft (not shown) typically at a pressure of about 5 bars, such that the annular chamber 4 is filled progressively with hydraulic fluid as the rod 2 is pushed in, thereby avoiding any cavitation.

When the helicopter takes off, the gas under pressure in the pneumatic chambers 12, 22 pushes back the hydraulic fluid contained in the fluid chambers 13 and 23 through the throttle members 14 and 24 towards the uninterrupted chamber 5, thereby pushing the rod 2 towards its extended position. The hydraulic fluid contained in the annular chamber 4 is pushed back to the pressurized hydraulic fluid supply of the aircraft.

Since the pneumatic chambers are thus offset into external auxiliary cylinders on the sides of the main cylinder, the extended shock absorber thus presents a length L taken between the fastener axes of the end lugs 6, 7 that is particularly compact.

In a particular aspect of the invention, the shock absorber is designed to enable the rocker beam to be retracted in order to limit its aerodynamic drag in flight. For this purpose, controlled shortening of the shock absorber is organized as follows. High pressure hydraulic fluid (typically at 206 bars) is injected into the annular chamber 4 via the first controlled valve 30, thereby tending to retract the rod 2 into the main cylinder 1. Simultaneously, a second controlled valve 31 enables the uninterrupted chamber 5 to be put into communication with a flask 40 such that the hydraulic fluid contained in the uninterrupted chamber 5 can be evacuated into said flask 40. The hydraulic fluid received in the flask 40 pushes back a piston 41 slidably mounted in the flask 40, which in turn pushes back the hydraulic fluid present under the piston 41 towards the supply of the aircraft. It should thus be observed that the hydraulic fluid from the uninterrupted chamber 5 does not become mixed with the hydraulic fluid of the aircraft. When the rod 2 comes into abutment against the end wall of the main cylinder 1, the first controlled valve 30 is closed such that the hydraulic fluid present in the annular chamber 4 is held captive, thereby preventing the shock absorber from expanding.

It should be observed that during this retraction, the pneumatic chambers 12 and 22 are not compressed since their inflation pressures are higher than the pressure in the flask 40 (substantially the same pressure as the tank, i.e. 5 bars), such that the hydraulic fluid passes preferentially towards the flask 40.

In order to cause the shock absorber to return to its extended position, it suffices to open the first controlled valve 30 to put the annular chamber 4 into communication with the supply of the aircraft, and simultaneously to open the second controlled valve 31, if closed. Substantially the same pressure then exists on either side of the piston 3, and because of the differences in section between the annular chamber 4 and the uninterrupted chamber 5, the rod is driven outwards and the shock absorber extends, until it returns to the position shown in FIG. 1.

In the invention, the shock absorber is capable of overtravel in the event of a particularly hard landing. For this purpose, the rod 2 includes a hollow orifice opening out to the side of the piston 3 and receiving an abutment piece 50 in the bore in the rod 2 so as to project from the rod 2. The abutment piece 50 is held to the rod by a pin 51. The abutment piece 50 has an end wall, and a sealing gasket 52 is disposed between the rod 2 and the abutment piece 50, thus enabling the bore of the rod to be isolated from the uninterrupted chamber 5.

When the shock absorber is used for retracting the undercarriage, the abutment piece 50 comes into abutment against the end wall 53 of the main cylinder 1, thereby defining the retracted position of the shock absorber. When the shock absorber is used for damping impacts on landing, the abutment piece 50 normally does not engage the end wall 53 of the main cylinder 1. However, during certain hard landings, not only can the abutment piece 50 come into contact with the end wall 53, but the energy that needs to be absorbed can be such that this contact does not suffice to stop the shock absorber being shortened. In the invention, the pin 51 is then designed to shear beyond a predetermined force threshold for the purposes firstly of absorbing a fraction of the surplus landing energy by rupturing the pin 51, and also of allowing the rod 2 to perform overtravel in the main cylinder 1, thereby overcompressing the pneumatic chambers 12, 22, also contributing to absorbing another fraction of the surplus landing energy.

The shearing rupture of the pin propels the abutment piece 50 towards the bottom of the bore in the rod 2, such that the abutment piece 50 no longer co-operates with the sealing gasket 52. The hydraulic fluid contained in the uninterrupted chamber 5 can then flow (slowly) between the abutment member 52 and the wall of the bore in the rod 2 so as to empty out through a bleed orifice 54 located at the bottom of the rod, thereby contributing to reducing the high pressure that exists in the shock absorber because of the overcompression.

It should be observed that under normal circumstances, the bleed orifice 54 runs the risk of putting the annular chamber 4 into communication with outside air. To avoid any such air mixing with the hydraulic fluid of the aircraft, a floating piston 55 is disposed in sealed manner between the cylinder 1 and the rod 2 such that the arrival of hydraulic fluid via the first controlled valve 30 takes place under the floating piston 55, while air coming from the bleed orifice 54 can only fill the space that extends between the floating piston 55 and the piston 3 of the rod 2. There is thus no risk of the hydraulic fluid of the aircraft being polluted by outside air.

The invention is not limited to the above description, but on the contrary covers any variant coming within the ambit defined by the claims.

In particular, although the invention is shown herein in association with a shock absorber used for a helicopter undercarriage of the type that includes a rocker beam directly hinged to the fuselage of the helicopter, the shock absorber shown being hinged between the rocker beam and a hinge point on the fuselage, the invention is not limited to an undercarriage of that type; for example it can be applied perfectly well to an undercarriage of the direct type in which the strut forms the main cylinder 1 and the rod 2 carries the wheel(s) directly.

Although the auxiliary cylinders are shown as being fastened directly to the main cylinder so that the throttle members are disposed at the inlet to the auxiliary cylinders, the auxiliary cylinders could be located elsewhere. For example, they could be secured to the side of the main cylinder, parallel thereto, the auxiliary cylinders being connected to the main cylinder via fluid flow connections, e.g. using rigid pipework. It is also possible to fix the auxiliary cylinders in the wheel bay of the aircraft, but that would require additional interfaces to be provided on the aircraft. Under such circumstances, provision should be made for a fluid flow connection with a flexible hose or a hose capable of accommodating movements of the shock absorber relative to the hose. Under all circumstances, it is preferable for the throttle members to be disposed at the inlet to the fluid flow connections such that said connections and the auxiliary cylinders are not subjected to the high pressures that exist in the uninterrupted chamber 5 while the shock absorber is being shortened.

Although the present description relates to a shock absorber having two pneumatic chambers, it would naturally be possible to apply the invention to a shock absorber having a single pneumatic chamber, or on the contrary having more than two pneumatic chambers. For example, the two pneumatic chambers could be placed in series in a single auxiliary cylinder.

What is claimed is:

1. A shock absorber for an aircraft undercarriage, the shock absorber comprising a main cylinder in which a rod is mounted to slide telescopically, the shock absorber having at least one pneumatic chamber filled with gas, a supply of hydraulic fluid, and throttle means for throttling the hydraulic fluid such that when the shock absorber is shortened, the gas in the at least one pneumatic chamber is compressed and the hydraulic fluid is throttled, in which the at least one pneumatic chamber is fully contained in at least one auxiliary cylinder external to the main cylinder, and in each of which a sealed piston is slidably mounted to separate a pneumatic chamber contained in said external auxiliary cylinder from a fluid chamber in fluid flow communication with the main cylinder, wherein the throttle means are disposed at the inlet of a fluid flow connection between the main cylinder and the at least one auxiliary cylinder, and wherein the at least one auxiliary cylinder is rigidly fastened to the main cylinder and extends in a direction that is substantially perpendicular to a longitudinal axis of the shock absorber.

2. A shock absorber according to claim 1, including controlled means for injecting hydraulic fluid into an annular chamber extending between the rod and the main cylinder, and controlled means for simultaneously exhausting the hydraulic fluid contained in the supply of fluid.

3. A shock absorber according to claim 2, including an associated flask for receiving the hydraulic fluid coming from the supply of fluid.

4. A shock absorber according to claim 1, including abutment means defining a retracted position of the rod in the main cylinder.

5. A shock absorber according to claim 4, in which the abutment means can be retracted beyond a predetermined force threshold bay so as to allow the shock absorber to perform overtravel, at least in the event of a hard landing.

6. A shock absorber according to claim 1, in which the hydraulic fluid chamber in each auxiliary cylinder is separated from the hydraulic fluid supply of the main cylinder solely by the throttle means disposed at the inlet to each said auxiliary cylinder.

7. An undercarriage including at least one shock absorber according to claim 1.

8. A shock absorber according to claim 1, wherein the rod carries a sealing piston inside the main cylinder, the sealing piston defining an annular chamber and an uninterrupted chamber, said annular chamber and said uninterrupted chamber being fluidly isolated from one another.

9. A shock absorber according to claim 1, wherein said at least one pneumatic chamber is a first pneumatic chamber having a first gas pressure and a second pneumatic chamber having a second gas pressure, said second gas pressure being greater than said first gas pressure.

* * * * *